UNITED STATES PATENT OFFICE.

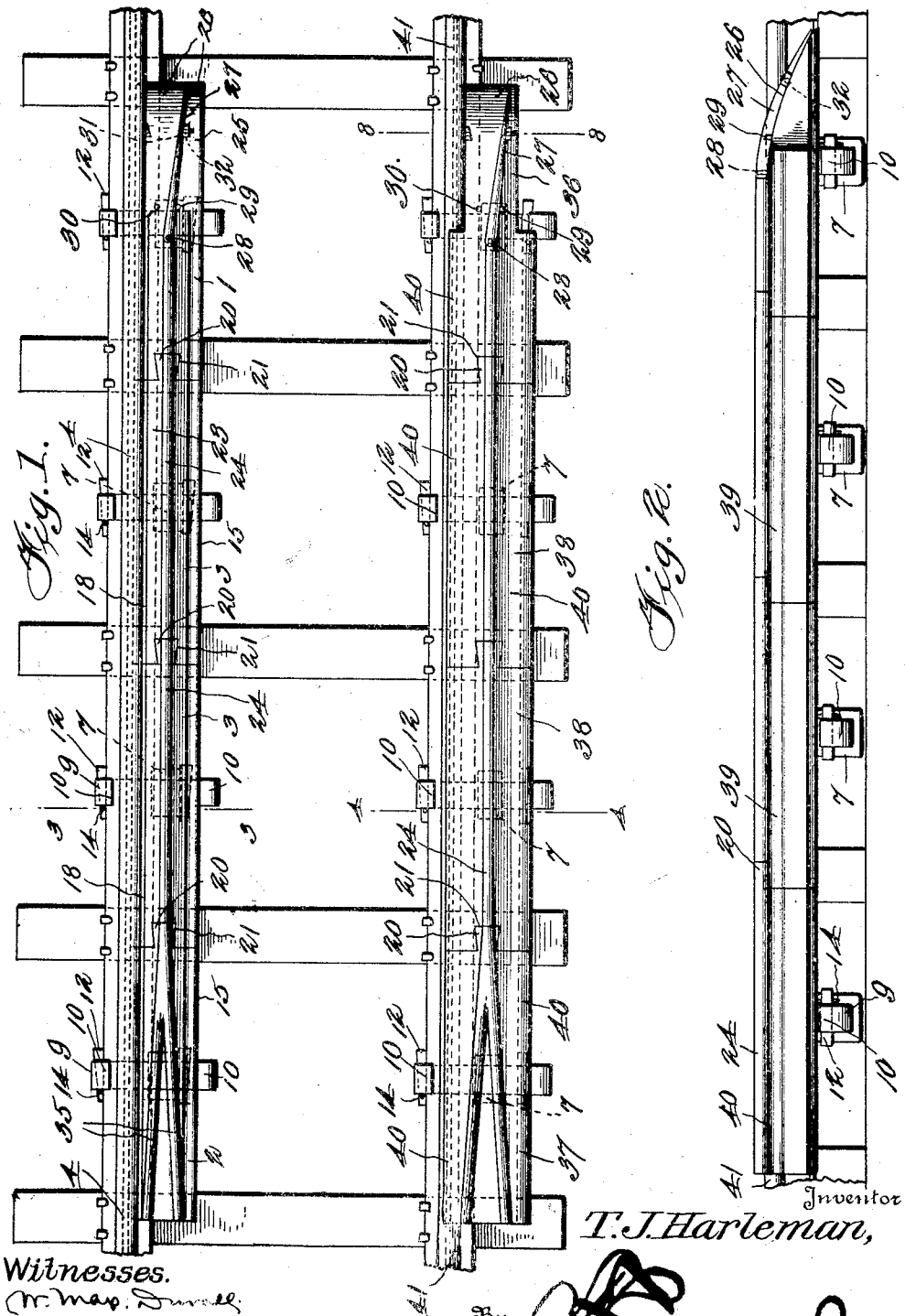

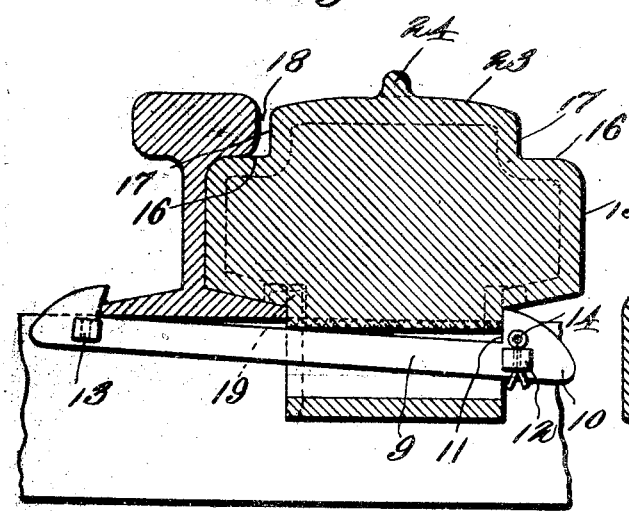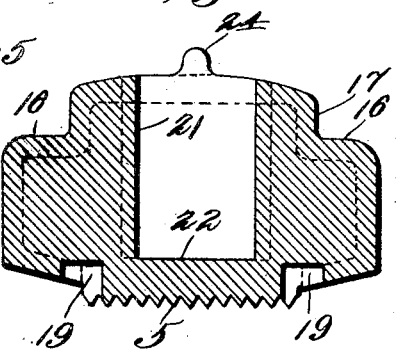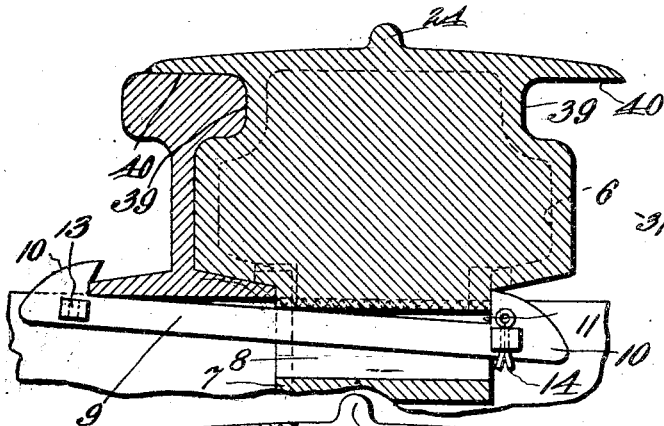

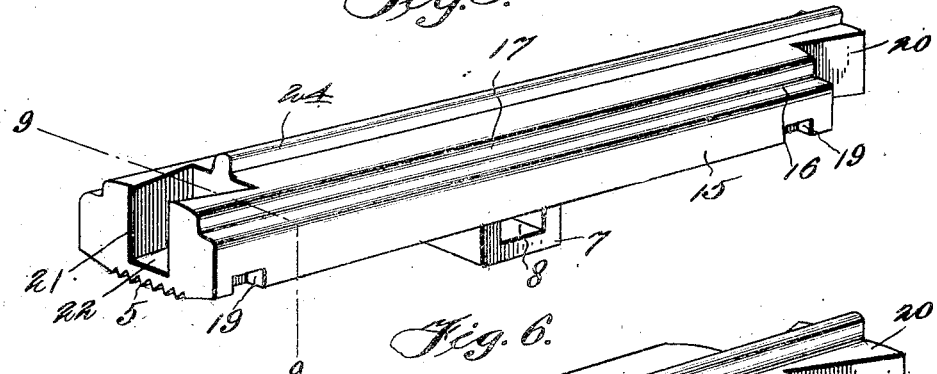
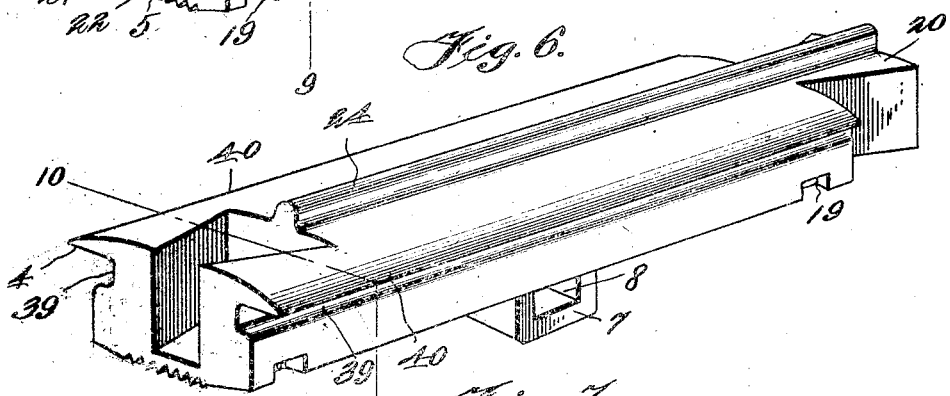
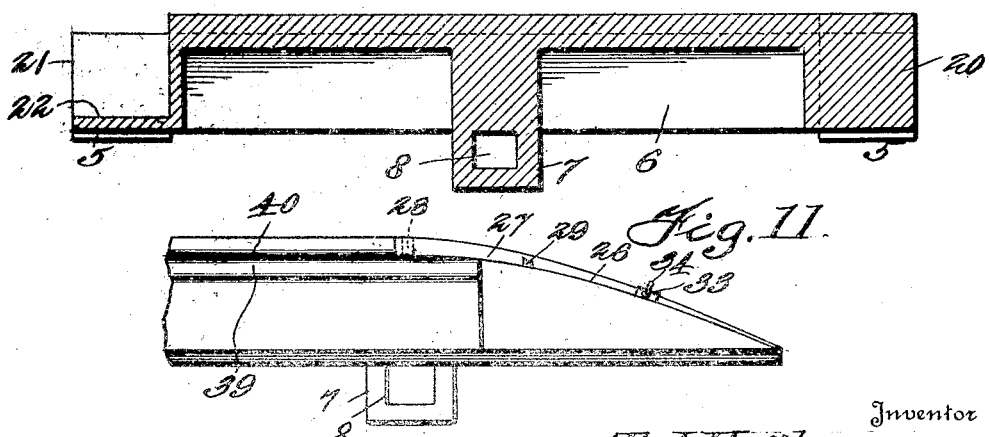

THOMAS J. HARLEMAN, OF PACKERTON, PENNSYLVANIA.

CAR-REPLACER.

1,164,512.  Specification of Letters Patent.  Patented Dec. 14, 1915.

Application filed June 11, 1915. Serial No. 33,552.

*To all whom it may concern:*

Be it known that I, THOMAS J. HARLEMAN, a citizen of the United States, residing at Packerton, in the county of Carbon and State of Pennsylvania, have invented certain new and useful Improvements in Car-Replacers; and I do hereby declare the following to be a full, clear, and exact description of the invention, such as will enable others skilled in the art to which it appertains to make and use the same.

The invention relates to improvements in car replacers.

The object of the present invention is to improve the construction of car replacers and to provide a simple, practical, and comparatively inexpensive car replacer designed particularly for replacing heavy modern locomotives and cars where there is but slight clearance between the wheels and the trucks or other overhead portions and adapted to lift a locomotive or car laterally to replace it on the rails.

A further object of the invention is to provide a car replacer of this character which will be either right or left hand as required and which will be capable of replacing a wheel ten or twelve inches from the track as is often necessary when large modern locomotives having heavily counterbalanced driving wheels are derailed.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a plan view of a car replacer constructed in accordance with this invention, Fig. 2 is a side elevation of the same, showing the outside replacing device, Fig. 3 is an enlarged transverse sectional view on the line 3—3 of Fig. 1, Fig. 4 is a similar view on the line 4—4 of Fig. 1, Fig. 5 is a detail perspective view of one of the intermediate sections of the inside replacing device, Fig. 6 is a perspective view of one of the intermediate sections of the outside replacing device, Fig. 7 is a longitudinal sectional view of the section shown in Fig. 5, Fig. 8 is a detail sectional view taken substantially on the line 8—8 of Fig. 1, Fig. 9 is an enlarged detail sectional view on the line 9—9 of Fig. 5, Fig. 10 is a similar view on line 10—10 of Fig. 6. Fig. 11 is a detail view of the front section illustrating the arrangement of the frog and the front and rear lugs.

Like numerals of reference designate corresponding parts in all the figures of the drawings.

In the accompanying drawings in which is illustrated the preferred embodiment of the invention the car replacer comprises in its construction inside and outside replacing devices each adapted for use at either side of the track so that only one set of such devices is required. The inside replacing device comprises a front end section 1, a rear end section 2 and intermediate sections 3 which may be of any desired number to provide a replacing device of sufficient length to receive a locomotive or passenger car to enable the wheels thereof to be arranged upon the said device before the wheels are forced laterally on to the adjacent rail 4. Each of the sections is designed to be of a length to rest upon the adjacent cross ties and to span the space between the same and it is provided at its ends with roughened lower faces 5 for engaging the cross ties to prevent the sections from slipping. Each section is constructed of suitable metal and is preferably cored or hollowed out at the lower face as shown at 6 to reduce the weight and cost of the device and the said section is provided preferably at the center with a depending transverse portion 7 having an opening 8 for the reception of a locking device 9 for securing the sections to the adjacent rail 4. The opening 8 is disposed transversely with respect to the sections and the locking device 9 consists of a straight bar provided at each end with a head 10 tapered outwardly and forming a shoulder 11 for engaging the outer edge of the bottom flange of the rail as clearly illustrated in Fig. 3 of the drawings.

The shoulder 11 is under cut to form a substantially hook shaped head which is retained in engagement with the rail by a wedge 12 which is driven into engagement with the adjacent end of the depending transversely disposed portion 7 of the section. The locking device is provided at each end with a wedge 12 which is arranged in an opening 13 and which is provided at the smaller end with a cotter pin 14 or other suitable key for preventing the wedge from leaving the opening 13. The hook shaped heads of the locking device are of a size to pass through the transverse opening 8 and the wedges will prevent the locking device from being lost from the section when they are not in engagement with the rail.

The sections of the inside replacing device are provided with reduced laterally extending portions 15 adapted to extend into and fit against the rail at the web thereof and formed by upper longitudinal side grooves 16 which are also of a width to space the side walls 17 from the head of the rail to provide an intervening space or groove as clearly shown at 18 in Fig. 3 of the drawings to permit the flange of the wheels to drop at the inner side of the rail. The sections are also provided at their side edges with lower recesses 19 adapted to permit the sections to fit over the heads of the spikes of the rail so that the said fastening devices will not interfere with the arrangement of the sections in close contact with the rails. The sections are detachably interlocked by means of inwardly tapered dove-tail tongues 20 formed on one of the contiguous ends of the sections and fitting in a corresponding dove-tail recess 21 of the other contiguous end. The tongue which extends longitudinally of the section is of a thickness slightly less than that of the section and the recess 21 is provided with a bottom wall 22 of substantial thickness and against which the lower face of the tongue fits. By this construction the sections are detachably and firmly interlocked when assembled for operation.

The upper wheel receiving face 23 of the section has a gradual, lateral slope or inclination from a central, longitudinal rib 24 to the side grooves where the upper face of the section is located in a plane slightly below the upper face of the tread of the rail so that there is no liability of a wheel being forced laterally entirely across the rail 4 which acts as a guard rail in replacing a locomotive or car. The rib 24 which also forms a guard rail extends along the section from the recess to the end of the tongues 20 so that it is solidly supported throughout its entire length.

The front section 1 is provided with a tapered portion 25 presenting an inclined upper face 26 upon which a wheel is adapted to readily ride and the inside wheel is guided to the outside of the longitudinal rib and in the direction of the rail on which it is to be replaced by a pivoted frog or switch member consisting of a bar 27 pivoted at its upper or rear end 28 and movable laterally between front and rear stop lugs 29 and 30. The bar or frog 27 and the front lugs 29 are provided with registering perforations 31 and 32 which are adapted to receive a bolt 33 or other suitable fastening device provided at one end with a head and having a key 34 or other suitable fastening means at the other end. The head which is located at the inner end of the bolt is countersunk in the bar or frog to prevent it from coming into contact with the wheel and the perforation 31 of the bar or frog is flared or tapered at each end to receive the head of the fastening device. The rear lug 30 which forms a stop for the rear portion of frog or bar to relieve the pivot 28 of strain are beveled or tapered to present upper inclined faces so that a wheel may readily ride over them should it come in contact with the same. The pivot bar or frog 27 is adapted to be secured to the end section of either side of the tapered portion thereof and it is readily changed from one position to the other to adapt the inside replacing device for use as either a right hand or left hand device.

The rear section 2 is provided with integral rearwardly diverging ribs 35 extending from the front end of the tongue of the rear section and having their front end or apex of a width corresponding to the width of the rib of adjacent intermediate section. The diverging ribs extend to the side portions of the rear section and are adapted to direct a wheel on to the adjacent rail.

The outside replacing device is composed of sections 36, 37 and 38 located at the front, back and intermediate portions of the outside replacing device which is adapted to be arranged at either side of the track. These sections are constructed similar to the sections of the inside replacing device with the exception that the side grooves 39 are shaped to receive the heads of the rails and the sections are provided with laterally projecting flanges 40 which are arranged upon and overlap the treads of the adjacent rail 41. The flanges 40 form continuations of the upper faces of the sections of the outside replacing device.

The fastening means and the interlocking means of the section of the outer replacing device are the same in construction as those heretofore described and similar reference characters are applied thereto. Also the ribs and the pivoted frog of the outside replacing device are the same as those of the inside replacing device and further description thereof is deemed unnecessary. In practice, the replacing devices will be made to fit the larger size rails, say the 110 pound rail now in use and suitable fillers will be provided for supporting or filling out the overlapping or overhanging side flanges of the outside device when the same is used in connection with a smaller rail.

The present invention is designed particularly for replacing heavy modern locomotives and cars which are very difficult to replace with the ordinary car replacer consisting of separate devices arranged at different points along the track for guiding the various displaced or derailed wheels back upon the rails. The difficulty with these devices is increased owing to the small clearance in such heavy locomotives and cars between the wheels and the truck or other overhead portion which prevents the wheels from being lifted any considerable distance without coming in contact with such overhead portions. The present invention is adapted to lift a heavy modern locomotive or car clear of the road bed before the wheels are forced laterally over the rails on which they are to be replaced. The locomotive or car is drawn upwardly over the front inclined faces and the wheels are guided along the inside and outside replacers in a straight line until the entire car or locomotive is supported upon the replacing devices clear of road bed. The wheels are then successively forced laterally by the contiguous portions of the rearwardly diverging ribs of the rear section. This renders comparatively easy what is almost impossible when a locomotive or car of this character is derailed, namely, forcing the wheels successively over the rails as the heavy locomotive or car resting upon the road bed resists this lateral movement which resistance is not present when the locomotive or car is wholly supported as before explained upon the smooth surfaces of the inside and outside replacers.

It will be seen that the car replacer is exceedingly simple and inexpensive in construction, that it may be readily made any desired length to suit the length of a car or engine to be replaced and that as it does not lift the wheels 6 or 7 inches above the rails like the ordinary car replacers in use, that it is particularly adapted for replacing heavy modern locomotives and cars where there is but a small clearance above the wheels. It will also be clear that the car replacer is adapted to replace wheels 10 or 12 inches from the rails as is very often required especially when large modern locomotives having heavily balanced driving wheels are derailed. Furthermore, it will be clear that an engine or car will be drawn on and run along the inside and outside replacing devices and removed entirely from the road bed before it is forced laterally on to the rails. This will enable heavy engines and long cars to be readily replaced.

What is claimed is:—

1. A car replacer including front, rear and intermediate sections detachably interlocked at their ends, said sections being provided with means for guiding a wheel on to a rail, comprising a front pivoted bar or frog, a longitudinal rib and rear diverging ribs.

2. A car replacer including a plurality of separate detachably interlocked sections provided at their contiguous ends with a joint consisting of a dove-tailed recess formed in one of the sections and having a bottom wall and a dove-tailed tongue extending from the other section and fitted in the said recess, said sections being also provided with means for guiding a wheel on to a rail.

3. A car replacer including a plurality of separate sections arranged end to end, the front end sections being tapered or inclined, a rib extending along the sections from the inclined portion and a pivoted bar or frog mounted on the inside portion and movable to either side thereof.

4. A car replacer including a plurality of separate sections arranged end to end, the front end sections being tapered or inclined, a rib extending along the sections from the inclined portion and a pivoted bar or frog mounted on the inside portion and movable to either side thereof, front and rear lugs located at opposite sides of the said inclined portion to abut against the frog or bar, and means for securing the frog or bar in either position against the said lug.

5. A car replacer including a plurality of sections arranged end to end and provided with side grooves forming reduced side portions adapted to fit against the web of a rail, said sections being provided with depending portions having transverse openings, and a locking device for each of the sections including a bar extending through the transverse openings and provided at its ends with heads adapted to engage a rail at the opposite side from which the section fits and adjusting means for securing the head in engagement with the rail.

6. A car replacer including a plurality of sections arranged end to end and provided with side grooves forming reduced side portions adapted to fit against the web of a rail, said sections being provided with depending portions having transverse openings, and a locking device consisting of a bar provided at each end with a substantially hook shaped head and with a wedge, each wedge being adapted to coöperate with the head at the opposite end of the bar for securing the section to a rail.

7. A car replacer including a plurality of sections arranged end to end and grooved at opposite sides to provide projecting side portions to fit against the webs of rails, said sections being also provided with bottom recesses and having fastening means extensible from either side of the section for engaging a rail.

8. A car replacer of the class described including a plurality of separate sections arranged end to end and having reduced side portions to fit against the webs of the rails, said reduced portions being formed by upper grooves having side walls spaced from the rails to receive the flange of a wheel and means carried by the sections for guiding a wheel to a rail.

9. A car replacer of the class described including a plurality of sections arranged end to end and provided at opposite sides with grooves forming lower laterally projecting portions and adapted to receive the head of a rail, said sections being also provided with laterally projecting flanges adapted to overlap the rail and means carried by the sections for guiding a wheel to a rail.

10. A car replacer of the class described including inside and outside replacing devices each comprising a plurality of sections arranged end to end and detachably interlocked, said sections being provided with side portions adapted to fit against the adjacent rail and having guiding means for directing the wheels of a car or locomotive to the said rails, the inside replacing device having longitudinal grooves at each side and the outside replacing device being provided with laterally projecting flanges adapted to overlap a rail.

In testimony whereof I affix my signature in presence of two witnesses.

THOMAS J. HARLEMAN.

Witnesses:
RALPH E. SCHEIRER,
ROBERT R. HARLEMAN.